United States Patent [19]
Itoh

[11] Patent Number: 5,107,134
[45] Date of Patent: Apr. 21, 1992

[54] MATRIX CIRCUIT OF FM STEREO MULTIPLEX DEMODULATION CIRCUIT

[75] Inventor: Masashi Itoh, Yokohama, Japan

[73] Assignee: Kabushiki Kaisha Toshiba, Japan

[21] Appl. No.: 495,699

[22] Filed: Mar. 19, 1990

[30] Foreign Application Priority Data

Mar. 22, 1989 [JP] Japan ................. 1-69801

[51] Int. Cl.$^5$ .................. H03K 17/62; H03K 5/00
[52] U.S. Cl. ..................... 307/254; 307/270; 307/490; 330/288
[58] Field of Search .......... 307/254, 270, 490; 330/288; 381/3, 4

[56] References Cited

U.S. PATENT DOCUMENTS

| | | | |
|---|---|---|---|
| 4,049,977 | 9/1977 | Radovsky | 330/288 |
| 4,766,396 | 8/1988 | Taya et al. | 330/288 |
| 4,814,724 | 3/1989 | Tanigawa | 330/288 |

OTHER PUBLICATIONS

The Art of Electronics, Horowitz, Paul and Hill, Winfield, Cambridge University Press, 1980, pp. 88–91.
The Linear Circuits Data Book, Texas Instruments, Nov. 1983, pp. 5-53 through 5-57.
Operational Amplifier: Theory and Practices, James K. Roberge, John Wiley & Sons, 1975, pp. 392–396.

*Primary Examiner*—John Zazworsky
*Attorney, Agent, or Firm*—Banner, Birch, McKie & Beckett

[57] ABSTRACT

A matrix circuit includes a first resistor having one end connected to receive a current signal and another end connected to a first output node, a second resistor having one end connected to the one end of said first resistor, a first bipolar transistor having a first collector connected to the another end of said second resistor, a first emitter connected to a circuit ground and a first base connected to said first collector, and a second bipolar transistor having a second collector connected to a second output node, a second emitter connected to said circuit ground and a second base connected to said first base.

12 Claims, 5 Drawing Sheets

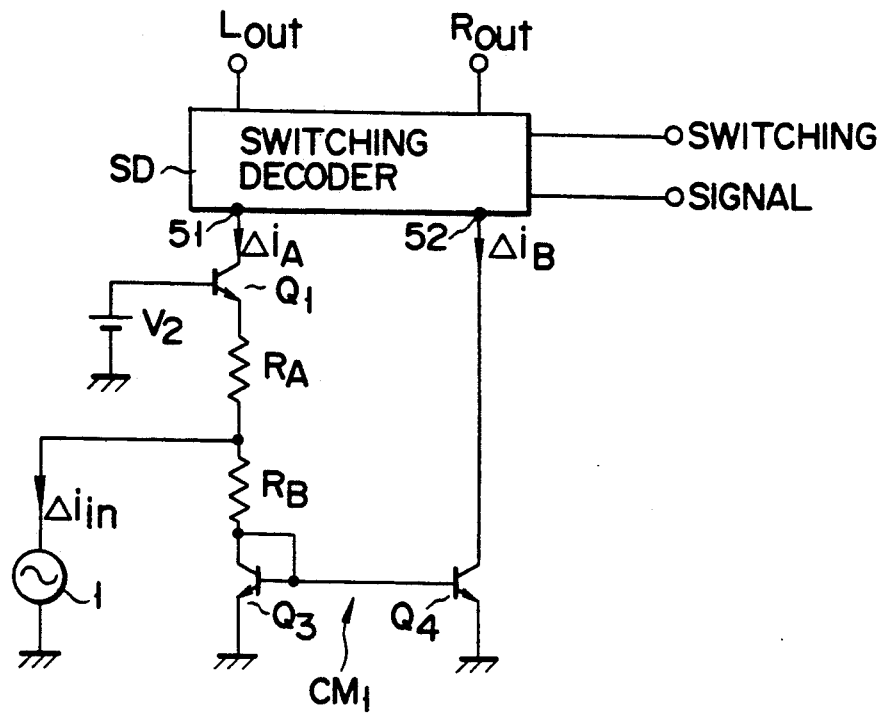
F I G. 2
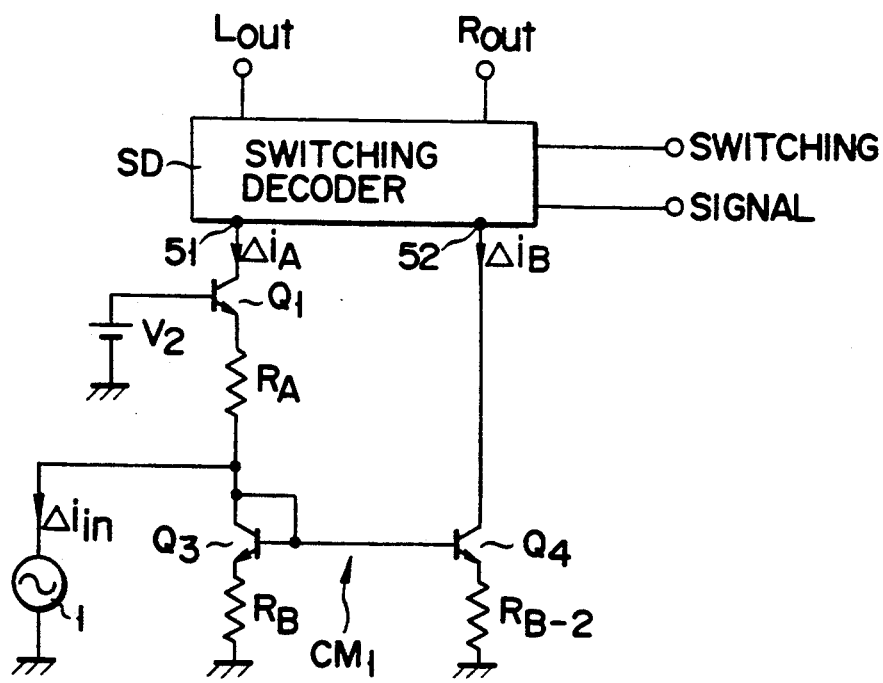
F I G. 3

MATRIX CIRCUIT OF FM STEREO MULTIPLEX DEMODULATION CIRCUIT

BACKGROUND OF THE INVENTION

1. Field of the Invention

This invention relates to a matrix circuit of an FM stereo multiplex demodulation circuit which is formed in an integrated circuit configuration and is used in a device capable of receiving FM stereo broadcast, and more particularly to a circuit for shunting a demodulated composite signal current in the preset ratio.

2. Description of the Related Art

A matrix circuit of an FM stereo multiplex demodulation circuit of the prior art is constructed as shown in FIG. 5. The block diagram thereof is shown in FIG. 7. That is, in the matrix circuit of FIG. 5, Q51 and Q52 denote NPN transistors whose emitters are connected together via respective matrix resistors $R_1$ and the connection node therebetween is connected to a ground terminal via a matrix resistor $R_2$. The bases of the NPN transistors Q51 and Q52 are connected to an input node 50 and a bias voltage ($V_1$) source, respectively. When an FM-demodulated composite signal voltage $\Delta vi$ is input to the input signal node 50, the input signal $\Delta vi$ is divided into shunt currents $\Delta i_1$ and $\Delta i_2$ which flow as collector currents of the NPN transistors Q51 and Q52 in the preset ratio.

In FIG. 7, 11 denotes a buffer circuit, 12 a V/I converter, 13 a tone controller, 14 an I/V converter, 15 a matrix circuit, and 16 a switching decoder.

Shunt currents $\Delta i_1$ and $\Delta i_2$ output from the matrix circuit are supplied to a switching decoder SD, switching-controlled by complementary switching pulse signals of 38 KHz and output as a left-channel signal Lout and a right-channel signal Rout.

In the above operation, the input signal $\Delta vi$, shunt currents $\Delta i_1$ and $\Delta i_2$, matrix resistances $R_1$ and $R_2$ have the following relations:

$$\Delta i_1 = \frac{\frac{\Delta vi}{R_1}}{1 + \frac{R_2}{R_1 + R_2}} \quad (1)$$

$$\Delta i_2 = \frac{\frac{\Delta vi}{R_1}}{1 + \frac{R_1 + R_2}{R_2}}$$

$$\frac{\Delta i_2}{\Delta i_1} = \frac{R_2}{R_1 + R_2}$$

In order to set the separation between the left-channel signal Lout and the right-channel signal Rout to a maximum value, the resistances $R_1$ and $R_2$ are determined to satisfy the following expression:

$$\frac{R_2}{R_1 + R_2} = \frac{\pi - 2}{\pi + 2}$$

As shown in FIG. 7, since the matrix circuit of the prior art receives a voltage signal $\Delta vi$ as an input, an FM-demodulated composite signal cannot be directly input in a case where the FM-demodulated composite signal is a current output, and in this case, the FM-demodulated composite signal can be input only after the composite signal is converted into a voltage signal $\Delta vi$ by means of a current-voltage (I/V) converting circuit (14 in FIG. 7).

As described above, the matrix circuit of the prior art cannot directly receive an FM-demodulated composite signal as an input in a case where the FM-demodulated composite signal is a current output, and can receive the same only after it is converted into a voltage signal $\Delta vi$ by use of the I/V converting circuit. Therefore, it tends to be restricted by the internal dynamic range, the operation efficiency of the power source is lowered and the number of elements used becomes larger.

SUMMARY OF THE INVENTION

An object of this invention is to provide a matrix circuit of an FM-stereo multiplex demodulation circuit in which an FM-demodulated composite signal can be supplied to a switching decoder by shunting an input current corresponding to the FM-demodulated composite signal in a preset ratio even when the FM-demodulated composite signal is a current output and input in the form of current.

According to this invention, there is provided a matrix circuit comprising a first resistor ($R_A$) having one end connected to receive a current signal and another end connected to a first output node (51); a second resistor ($R_B$) having one end connected to said one end of first resistor ($R_A$); a first bipolar transistor (Q3) having a first collector connected to the another end of said second resistor ($R_B$), a first emitter connected to a circuit ground (GND) and a first base connected to said first collector; and a second bipolar transistor (Q4) having a second collector connected to a second output node (52), a second emitter connected to said circuit ground (GND) and a second base connected to said first base.

With the above construction, the other end of each of the resistors ($R_A$) and ($R_B$) as viewed from a current signal supplied from a tone controller is a low impedance. Therefore, an input current is divided into shunt currents $\Delta i_A$ and $\Delta i_B$ depending on the resistance ratio of the first resistor ($R_A$) and second resistor ($R_B$).

At this time, the shunt current $\Delta i_B$ flowing in the second resistor ($R_B$) is derived with a phase opposite to that of the collector current $\Delta i_A$ of the first bipolar transistor (Q1).

Therefore, it becomes possible to derive shunt currents with opposite phases from the matrix circuit and to supply the same to the switching decoder. As a result, it becomes possible to supply the current signal from the tone controller directly to the matrix circuit without passing the same through the I/V converter.

Thus, there can be provided a matrix circuit of an FM stereo multiplex demodulation circuit which can supply an FM-demodulated composite signal to the switching decoder by shunting the input current with a preset ratio even if the FM-demodulated composite signal is a current output and is input as it is.

BRIEF DESCRIPTION OF THE DRAWINGS

FIGS. 2, 3 and 4 are circuit diagrams showing other embodiments of this invention;

DETAILED DESCRIPTION OF THE PREFERRED EMBODIMENTS

There will now be described a embodiment of this invention in detail with reference to the accompanying drawings.

Figure 1:
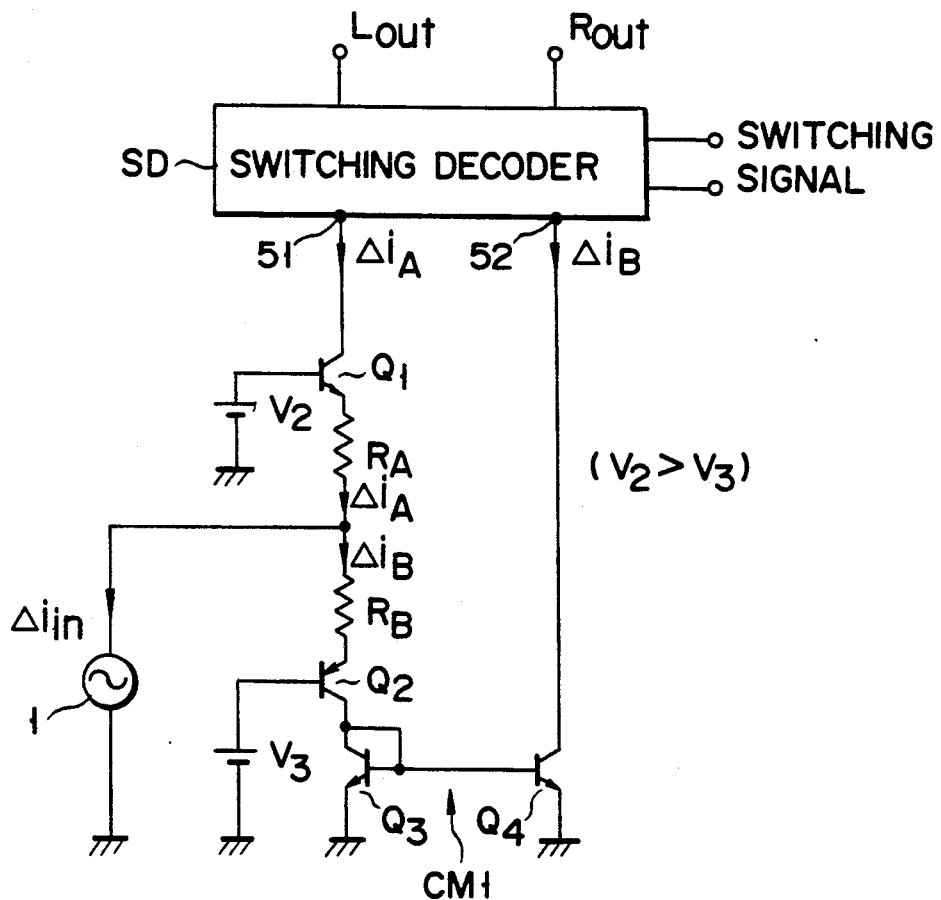
FIG. 1 is a circuit diagram showing one embodiment of a matrix circuit of an FM stereo multiplex demodulation circuit according to this invention.

FIG. 1 shows a matrix circuit of an FM stereo multiplex demodulation circuit formed in an IC. 1 denotes a current source supplying a FM-demodulated composite signal current output, and the emitter of an NPN transistor Q1 is connected to the output terminal of the current source 1 via a first matrix resistor $R_A$. Further, the emitter of a PNP transistor Q2 is connected to the output terminal of the current source 1 via a second matrix resistor $R_B$. The collector-emitter path of an NPN transistor Q3 whose base and collector are connected together is connected between the collector of the PNP transistor Q2 and a ground potential terminal. The base of the NPN transistor Q3 is connected to the base of an NPN transistor Q4 which has an emitter connected to the ground potential terminal. The NPN transistors Q3 and Q4 are combined to constitute a current mirror circuit CM1.

The base of the NPN transistor Q1 is applied with a bias power source voltage $V_2$ and the base of the PNP transistor Q2 is applied with a bias power source voltage $V_3$ ($< V_2$). The collector currents of the NPN transistors Q1 and Q4 are supplied to a switching decoder SD.

In the above matrix circuit, the other end of each of the matrix resistors $R_A$ and $R_B$ as viewed from the current source 1 is a low impedance, and an input current $\Delta i_{in}$ from the current source 1 is divided by the matrix resistors $R_A$ and $R_B$ in the ratio only depending on the resistance ratio of the matrix resistors $R_A$ and $R_B$. The shunt current $\Delta i_A$ flowing in the matrix resistor $R_A$ is derived out via the NPN transistor Q1, and the shunt current $\Delta i_B$ flowing in the matrix resistor $R_B$ is derived out with a direction opposite to that of the collector current of the NPN transistor Q4 via the PNP transistor Q2 and the current mirror circuit CM1.

In this way, the shunt currents $\Delta i_A$ and $\Delta i_B$ with opposite phases output from the matrix circuit are supplied to the switching decoder SD and switching-controlled by complementary switching pulse signals, thereby causing a left-channel signal Lout and a right-channel signal Rout to be derived out. In this case, the resistances of the matrix resistors $R_A$ and $R_B$ are so determined that the separation between the left-channel signal Lout and the right-channel signal Rout can be set to the largest value.

Next, the operation of the above matrix circuit is explained. The emitters of the NPN transistor Q1 and PNP transistor Q2 are low impedance and variation in the emitter resistances $R_E$ of the respective transistors is neglected for simplifying the explanation, then the following equations can be obtained:

$$\Delta i_A - \Delta i_B - \Delta i_{IN} = 0 \cdots \quad (2)$$

$$R_A \cdot \Delta i_A + R_B \cdot \Delta i_B = 0 \cdots \quad (3)$$

The following equation can be obtained by substituting the equation (3) into the equation (2) to eliminate $\Delta i_B$:

$$\Delta i_A = \frac{\Delta i_{IN} \cdot R_B}{R_A + R_B}$$

Then, $$\Delta i_B = - \frac{\Delta i_{IN} \cdot R_A}{R_A + R_B}$$

and therefore the following equation can be obtained:

$$\Delta i_B / \Delta i_A = - R_A / R_B$$

In this way, the ratio of the output currents $\Delta i_A$ and $\Delta i_B$ is determined by the ratio of $R_A$ and $R_B$ and currents with opposite phases can be derived.

The currents are supplied to the switching decoder SD and switching-controlled by complementary switching pulse signals, thus deriving a left-channel signal Lout and a right-channel signal Rout. In this case, the condition for setting the separation between the left-channel signal Lout and the right-channel signal Rout to maximum is expressed as follows:

$$R_A / R_B = \pi - 2 / \pi + 2$$

According to the above-described matrix circuit, an FM-demodulated composite signal output current can be directly input, and the input current can be shunt in the ratio only depending on the resistance ratio of the matrix resistors and then supplied to the switching decoder.

In a case where a filtering process or tone control operation is required to reduce stereo noise in the matrix circuit of the FM stereo multiplex demodulation circuit when an weak input is supplied, two processing circuits may be necessary and the number of elements used increases if the above process is effected after the separation between the left-channel signal Lout and the right-channel signal Rout is effected. Therefore, increase in the number of elements used can be reduced if the above process is effected at a stage before the switching decoder and the matrix circuit. In this case, if the filtering process or the like is effected with the current mode kept unchanged, it is less restricted by the internal dynamic range and the operation efficiency of the power source can be raised. At this time, since the output attained in the filtering process or the like is set in the current mode, it is preferable to directly input the current to the matrix circuit as in this invention.

Figure 4:
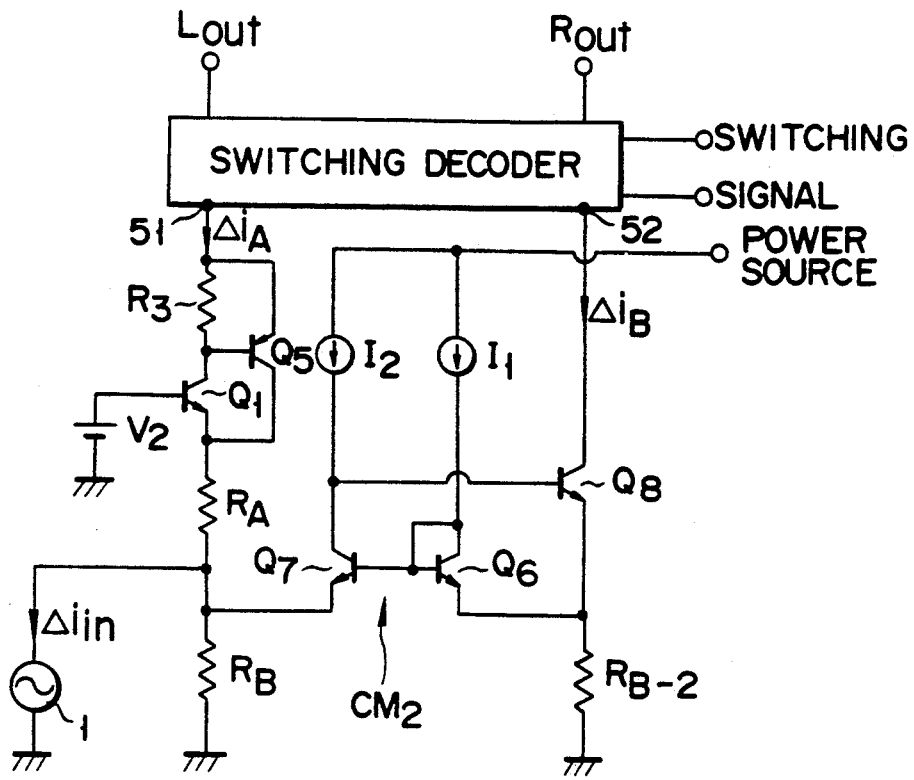
Figure 5:
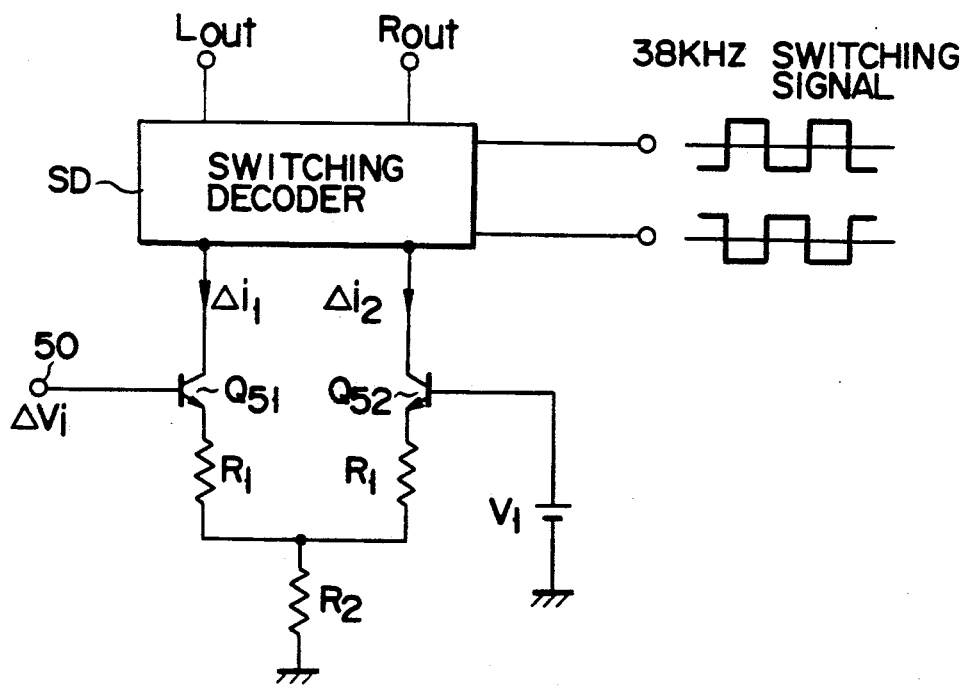
FIG. 5 is a circuit diagram showing an FM stereo multiplex circuit of the prior art.

FIGS. 2 to 4 show other embodiments of the matrix circuit of this invention. That is, the matrix circuit of FIG. 2 is similar to the matrix circuit of FIG. 1 except that the PNP transistor Q2 is omitted. Parts used in FIG. 2 and corresponding to those used in FIG. 1 are denoted by the same reference numerals.

The matrix circuit of FIG. 3 is similar to the matrix circuit of FIG. 1 except that the PNP transistor Q2 is omitted, and resistors $R_B$, $R_{B-2}$ are respectively connected to the emitters of NPN transistors Q3 and Q4 of the current mirror circuit CM1. Parts used in FIG. 3 and corresponding to those used in FIG. 1 are denoted by the same reference numerals.

Also, in the matrix circuits of FIGS. 2 and 3, the other end of each of the matrix resistors $R_A$ and $R_B$, $R_{B-2}$ as viewed from the current source 1 is a low impedance. Therefore, in the matrix circuits of FIGS. 2 and 3, the same effect as in the matrix circuit of FIG. 1 can be obtained.

The matrix circuit of FIG. 4 is similar to the matrix circuit of FIG. 1 except the following three points: (1) a resistor $R_3$ is connected to the collector of the NPN transistor Q1, the emitter-base path of a PNP transistor Q5 is connected across the resistor $R_3$, and the collector of the PNP transistor Q5 is connected to the emitter of the NPN transistor Q1; (2) the other end of the matrix resistor $R_B$ is connected to the ground potential terminal and the PNP transistor Q2 and the current mirror circuit CM1 are omitted; and (3) a current mirror circuit CM2 formed of an NPN transistor Q6 whose collector and base are connected together and an NPN transistor Q7, constant current sources $I_1$ and $I_2$ respectively connected to the collectors of the NPN transistors Q6 and Q7, a resistor $R_{B-2}$ connected between the emitter of the NPN transistor Q6 and the ground potential terminal, and an NPN transistor Q8 whose base-emitter path is connected between the collector of the NPN transistor Q7 and the emitter of the NPN transistor Q6 are further provided and one of the shunt currents, that is, the shunt current $\Delta i_B$ is output from the collector of the NPN transistor Q8. Other portions used in FIG. 4 and corresponding to those used in FIG. 1 are denoted by the same reference numerals.

In the matrix circuit of FIG. 4, since a negative feedback operation is effected with respect to the emitter of the NPN transistor Q1 by means of the resistor $R_3$ and the PNP transistor Q5, the impedance of the other end of the resistor $R_A$ is further lowered, and the other end of the resistor $R_B$ is grounded so that the impedance thereof is further lowered. As a result, the precision of the current shunting or dividing ratio is further enhanced, and a non-linear element caused by the emitter resistor $R_E$ is removed from the shunting path, thereby suppressing occurrence of distortion.

That is, since only constant currents flow into the collectors of NPN transistors Q6 and Q7 of the current mirror circuit CM2, a voltage occurring in the emitter of the NPN transistor Q7 (or a voltage drop of $\Delta i_B R_B$) caused by the shunt current $\Delta i_B$) is projected onto the emitter of the NPN transistor Q6 and a current expressed by the following equation is output via the NPN transistor Q8:

$$\frac{\Delta i_B \cdot R_B}{R_{B-2}} = \Delta i_B \ (R_B = R_{B-2})$$

Further, a negative feedback operation is effected with respect to the emitter of the NPN transistor Q1 by means of the resistor $R_3$ and the PNP transistor Q5, and the impedance of the emitter of the NPN transistor Q1 becomes extremely low. As a result, the shunt path from the emitter of the NPN transistor Q1 to the ground potential terminal includes only resistors $R_A$ and $R_B$ and does not include a non-linear element.

Further, only constant currents are permitted to flow in the NPN transistors Q6 and Q7 of the current mirror circuit CM2, no shunting current flows therethrough, and no non-linear element is included in the signal transmission path so that occurrence of distortion can be suppressed to a minimum.

Figure 6:
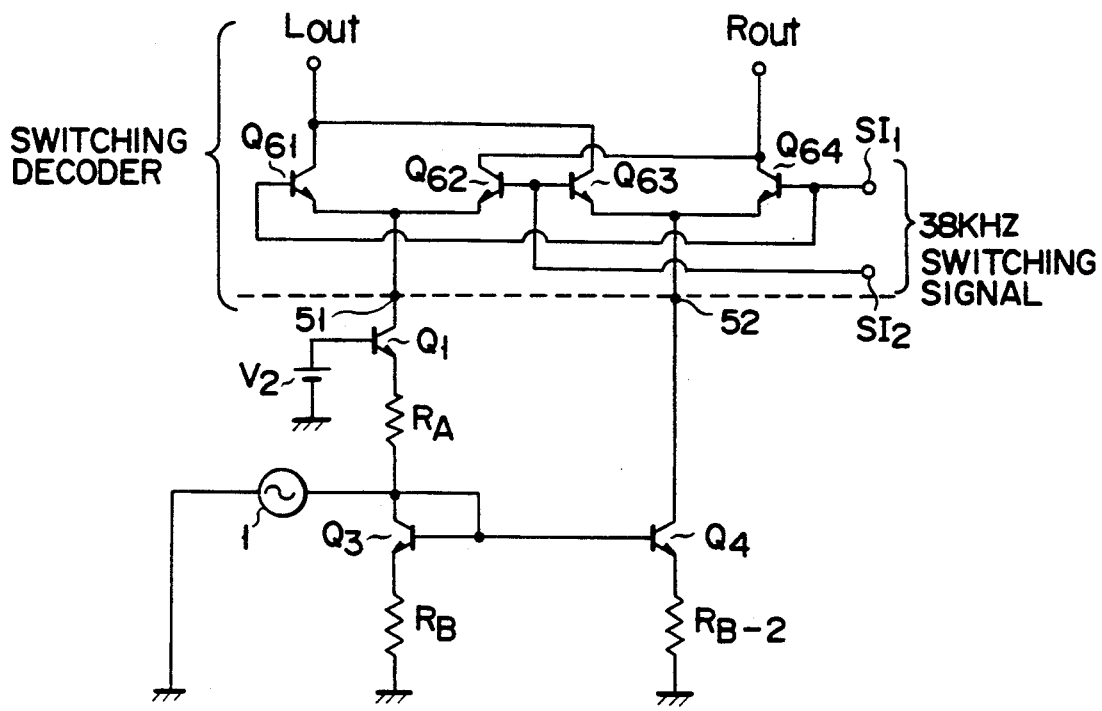
FIG. 6 is a circuit diagram showing an embodiment of a switching decoder.

FIG. 6 is a circuit diagram showing one embodiment of a switching decoder. In FIG. 6, a circuit formed of bipolar transistors $Q_{61}$, $Q_{62}$, $Q_{63}$ and $Q_{64}$ is shown as an example of the switching decoder. In this case, $Q_{61}$ is a bipolar transistor having a collector connected to a left-output terminal Lout, and a base supplied with a switching signal of 38 and an emitter connected to first input terminal 51. $Q_{62}$ is a bipolar transistor having a collector connected to a right-output terminal Rout, a base supplied with a switching signal of 38 KHz and an emitter connected to a first input terminal 51. $Q_{63}$ is a bipolar transistor having a collector connected to the left-output terminal Lout, a base connected to the base of the bipolar transistor $Q_{62}$ and an emitter connected to a second input terminal 52. $Q_{64}$ is a bipolar transistor having a collector connected to the right-output terminal Rout and the collector of the bipolar transistor $Q_{62}$, a base connected to the base of the bipolar transistor $Q_{61}$ and an emitter connected to the second input terminal 52.

Since a circuit described below has substantially the same construction as the circuit of FIG. 3, portions shown in FIG. 6 and corresponding to those in FIG. 3 are denoted by the same reference numerals and the explanation thereof is omitted.

Figure 7:
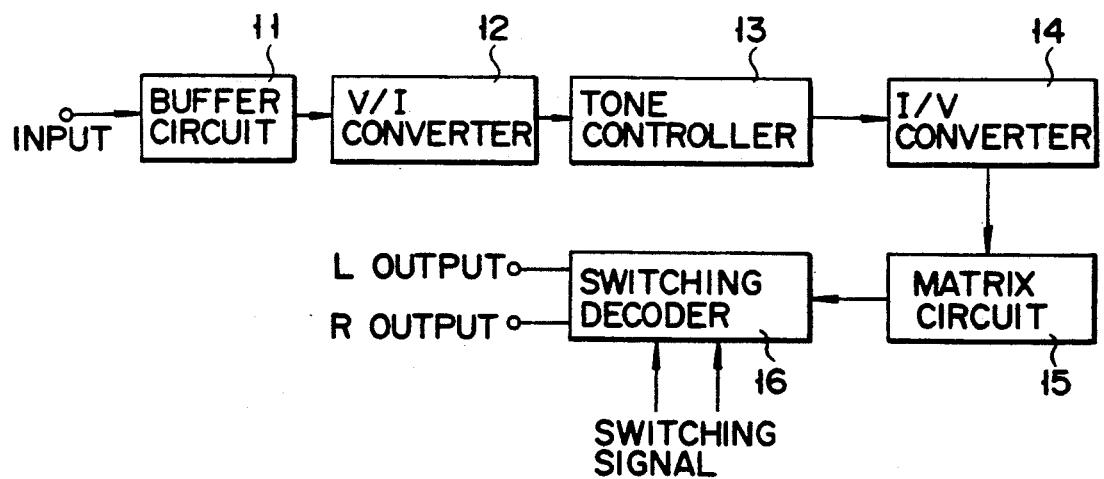
FIG. 7 is a block diagram showing a multiplex stereo demodulation section of the prior art.
Figure 8:
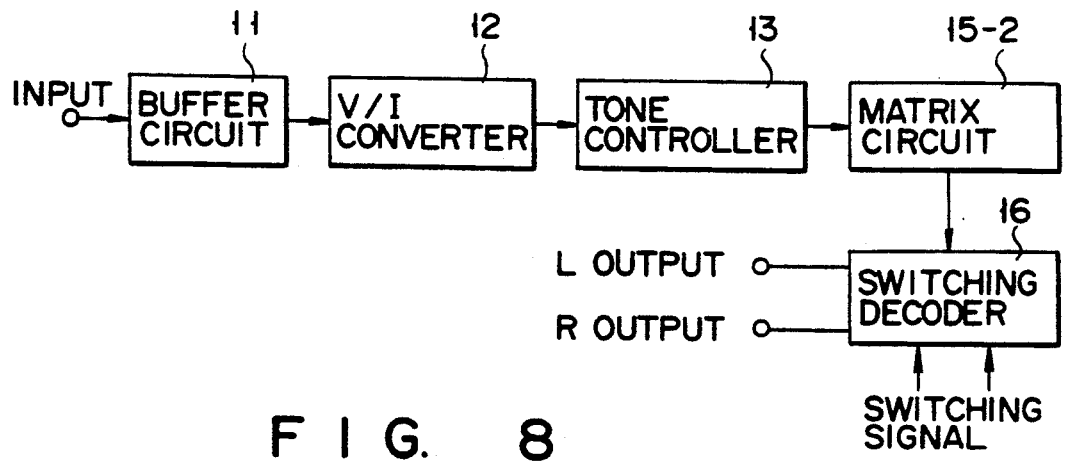
FIG. 8 is a block diagram showing an embodiment of this invention.

FIG. 8 is a block diagram showing an embodiment of this invention. In FIG. 8, 11 denotes a buffer circuit, 12 a V/I converter, 13 a tone controller, 15-2 a matrix circuit of this invention, and 16 a switching decoder. With this construction, the $L_{OUTPUT}$ and $R_{OUTPUT}$ can be derived without using the I/V converter 14 shown in the block diagram of FIG. 7 to which this invention is not applied.

Figure 9:
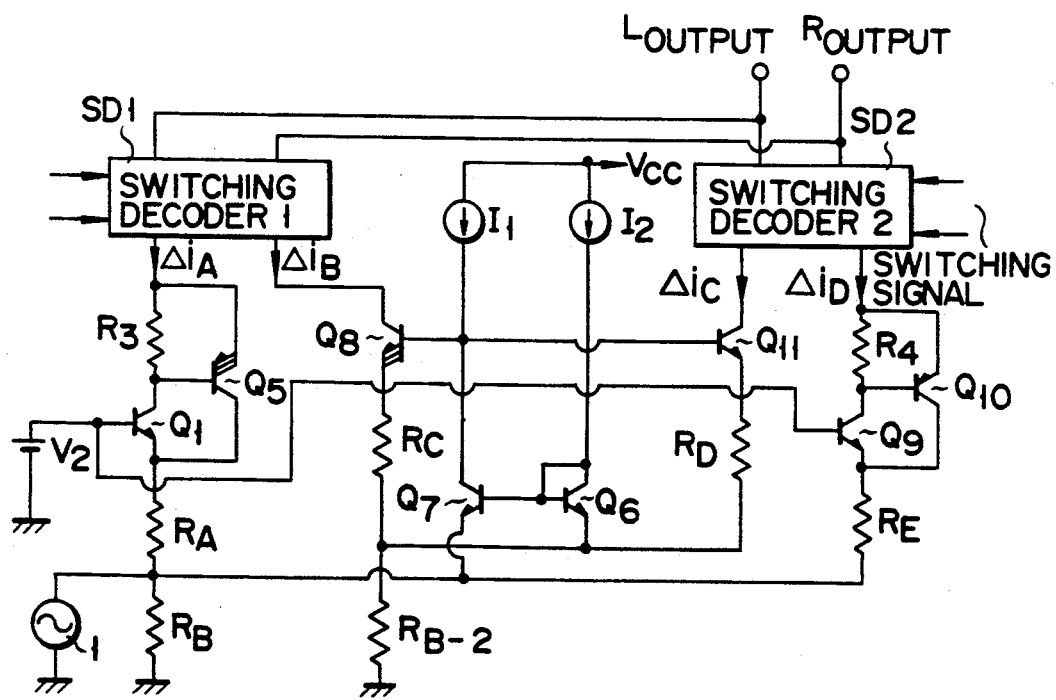
FIG. 9 is a circuit diagram showing an embodiment of this invention having a plurality of switching decoders.

Further, FIG. 9 is a circuit diagram showing still another embodiment according to this invention and having a plurality of switching decoders. SD1 and SD2 denote switching decoders, Q1, Q5, Q6, Q7, Q8, Q9, Q10 and Q11 bipolar transistors, $R_A$, $R_B$, $R_{B-2}$, $R_C$, $R_D$, $R_E$, R3 and R4 resistors, $I_1$ and $I_2$ constant current sources, and 1 a signal current source.

The circuit with the above construction includes a plurality of switching decoders supplied with switching signals of odd-multiple frequency ratio so as to constitute an anti-birdy system. Therefore, with this circuit, odd higher harmonic noise of the switching signal can be reduced.

As described above, according to the matrix circuit of the FM stereo multiplex demodulation circuit of this invention, the FM-demodulated composite signal current output can be directly input with the current mode kept unchanged, and the input current is shunted in the ratio depending only on the resistance ratio of the matrix resistors and can be supplied to the switching decoder. Therefore, it becomes unnecessary to convert the FM-demodulated composite signal current output into a voltage signal by means of the I/V converter, and the matrix circuit may be less influenced by the limitation of the internal dynamic range in comparison with the matrix circuit to which this invention is not applied, the operation efficiency of the power source can be enhanced and the number of elements used can be reduced.

What is claimed is:
1. A matrix circuit comprising:
a first output node;
a second output node;

a first resistor having a first terminal connected to receive a current signal and a second terminal coupled to said first output node;

a second resistor having a first terminal connected to said first terminal of said first resistor;

a first bipolar transistor having a first collector coupled to a second terminal of said second resistor, a first emitter connected to a circuit ground and a first base connected to said first collector; and a second bipolar transistor having a second collector connected to said second output node, a second emitter connected to said circuit ground and a second base connected to said first base.

2. A matrix circuit according to claim 1, wherein said first collector is coupled to said second terminal of said second resistor through a third bipolar transistor having a third emitter connected to said second terminal of said second resistor, a third base connected to a first preset potential and a third collector connected to said first collector of said first bipolar transistor.

3. A matrix circuit according to claim 2, wherein said second terminal of said first resistor is coupled to said first output node through a fourth bipolar transistor having a fourth collector coupled to said first output node, a fourth base connected to a second preset potential and a fourth emitter connected to said second terminal of said first resistor.

4. A matrix circuit comprising:
a first output node;
a second output node;
a first resistor having a first terminal connected to receive a current signal and a second terminal coupled to said first output node;

a second resistor having a first terminal connected to said first terminal of said first resistor and a second terminal connected to ground;

a third resistor having a first terminal coupled to said second output node and a second terminal connected to ground;

a first current source connected at a first terminal to a first predetermined potential;

a second current source connected at a first terminal to said first predetermined potential;

a first bipolar transistor having a first collector connected to a second terminal of said first current source, a first base connected to said collector and a first emitter coupled to said first terminal of said third resistor;

a second bipolar transistor having a second collector connected to a second terminal of said second current source, a second base connected to said first base of said first bipolar transistor and a second emitter connected to said first terminal of said first resistor;

wherein said third resistor is coupled to said second output node by a third bipolar transistor having a third collector connected to a second output node, a third base connected to said second collector of said second bipolar transistor and a third emitter connected to said first terminal of said third resistor;

wherein said second terminal of said first resistor is coupled to said first output node through a fourth bipolar transistor having a fourth collector coupled to said first output node, a fourth base connected to a first preset potential and a fourth emitter connected to said second terminal of said first resistor;

wherein said fourth collector of said fourth bipolar transistor is coupled to said first output node by a fifth bipolar transistor having a fifth emitter connected to said first output node, a base connected to said fourth collector of said fourth bipolar transistor and a fifth collector connected to said fourth emitter of said fourth bipolar transistor and a fourth resistor is connected between said fifth base and said fifth emitter of said fifth bipolar transistor.

5. A matrix circuit according to claim 4, further comprising:
switching decoder means, connected between said first output node and said second output node, for decoding a signal from said first and second output nodes.

6. A matrix circuit according to claim 5, wherein said switching decoder means comprises:
a sixth bipolar transistor having a sixth collector connected to a left signal output, a sixth base connected to a first signal input and a sixth emitter connected to said first output node;

a seventh bipolar transistor having a seventh collector connected to a right signal output, a seventh base connected to a second signal input and a seventh emitter connected to said sixth emitter of said sixth bipolar transistor;

an eighth bipolar transistor having an eighth collector connected to said left signal output, an eighth base connected to said seventh base of said seventh bipolar transistor and an eighth emitter connected to said second output node; and a ninth bipolar transistor having a ninth collector connected to said seventh collector of said seventh bipolar transistor, a ninth base connected to said first signal input and a ninth emitter connected to said eighth emitter of said eighth bipolar transistor.

7. A matrix circuit comprising:
a first output node;
a second output node;
a first resistor having a first terminal connected to receive a current signal and a second terminal coupled to said first output node;

a first bipolar transistor having a first collector connected to said first terminal of said first resistor, a first emitter coupled to a circuit ground and a first base connected to said first collector;

a second bipolar transistor having a second collector connected to said second output node, a second emitter coupled to said circuit ground and a second base connected to said first base;

a second resistor connected between said first emitter of said first bipolar transistor and said circuit ground; and a third resistor connected between said second emitter of said second transistor and said circuit ground, said third resistor having the same resistance value as said second resistor.

8. A matrix circuit according to claim 7, wherein said second terminal of said first resistor is coupled to said first output node through a third bipolar transistor having a third collector connected to said first output node, a third base connected to a first preset potential and a third emitter connected to said second terminal of said first resistor.

9. A matrix circuit comprising:
a first resistor having a first terminal connected to receive a current signal and a second terminal coupled to a first output node;

a first current source connected at a first terminal to a first predetermined potential;

a second current source connected at a first terminal to said first predetermined potential;

a first bipolar transistor having a first collector connected to a second terminal of said first current source, a first base connected to said collector and a first emitter coupled to a circuit ground;

a second bipolar transistor having a second collector connected to a second terminal of said second current source, a second base connected to said first base of said first bipolar transistor and a second emitter connected to said first terminal of said first resistor;

a third bipolar transistor having a third collector connected to a second output node, a third base connected to said second collector of said second bipolar transistor and a third emitter connected to said first emitter;

a second resistor having a first terminal connected to said second emitter of said second bipolar transistor and a second terminal connected to said circuit ground; and a third resistor having a first terminal connected to said first emitter of said first bipolar transistor and a second terminal connected to said circuit ground, said third resistor having the same resistance value as said second resistor.

10. A matrix circuit according to claim 9, wherein said second terminal of said first resistor is coupled to said first output node through a fourth bipolar transistor having a fourth collector coupled to said first output node, a fourth base connected a second predetermined potential and a fourth emitter connected to said second terminal of said first resistor; wherein said fourth collector of said fourth bipolar transistor is coupled to said first output node through a fifth bipolar transistor having a fifth bipolar emitter connected to said first output node, a fifth base connected to said fourth collector of said fourth bipolar transistor and a fifth collector connected to said fourth emitter of said fourth bipolar transistor and a fourth resistor is connected between said fifth base and fifth emitter of said fifth bipolar transistor.

11. A matrix circuit according to claim 10, further comprising:

switching decoder means, connected between said first and second output nodes, for decoding a signal from said first and second output nodes.

12. A matrix circuit according to claim 11, wherein said switching decoder means comprises:

a sixth bipolar transistor having a sixth collector connected to a left signal output, a sixth base connected to a first signal input and a sixth emitter connected to said first output node;

a seventh bipolar transistor having a seventh collector connected to a right signal output, a seventh base connected to a second signal input and a seventh emitter connected to said sixth emitter of said sixth bipolar transistor;

an eighth bipolar transistor having an eighth collector connected to said left signal output, an eighth base connected to said seventh base of said seventh bipolar transistor and an eighth emitter connected to said second output node; and a ninth bipolar transistor having a ninth collector connected to said seventh collector of said seventh bipolar transistor, a ninth base connected to said first signal input and a ninth emitter connected to said eighth emitter of said eighth bipolar transistor.

* * * * *